United States Patent [19]
Nelson

[11] 3,725,773
[45] Apr. 3, 1973

[54] RF SPECTROMETER HAVING MEANS FOR EXCITING RF RESONANCE OF A PLURALITY OF RESONANCE LINES SIMULTANEOUSLY USING A HIGH SPEED SCANNING MEANS

[75] Inventor: Forrest A. Nelson, Palo Alto, Calif.
[73] Assignee: Varian Associates, Palo Alto, Calif.
[22] Filed: Apr. 19, 1971
[21] Appl. No.: 135,257

[52] U.S. Cl.............................................324/0.5 AC
[51] Int. Cl..............................................G01n 27/00
[58] Field of Search........324/0.5 A, 0.5 AC, 0.5 AH, 324/0.5 G; 11/11

[56] References Cited
UNITED STATES PATENTS 3,475,680  10/1969  Anderson et al. .................324/0.5 A
3,461,381  10/1969  Nelson et al.......................324/0.5 A Primary Examiner—Robert J. Corcoran
Attorney—Stanley Z. Cole and Vincent W. Clearly

[57] ABSTRACT

In a Fourier transform spectrometer the sample is immersed in a polarizing magnetic field of intensity $H_0$ and is irradiated with radio frequency energy of a frequency $\omega$. The ratio of $\omega$ to $H_0$ is rapidly and repetitively scanned over a range of values to repetitively excite resonance of a plurality of resonance lines within the sample. The scanning repetition frequency is sufficiently high to sustain simultaneous resonance of the plurality of excited resonance lines. A signal representative of the composite resonance signal emanating from the sample and containing the plurality of simultaneous excited signals is complex multiplied by a signal representative of said scan frequency.

13 Claims, 7 Drawing Figures

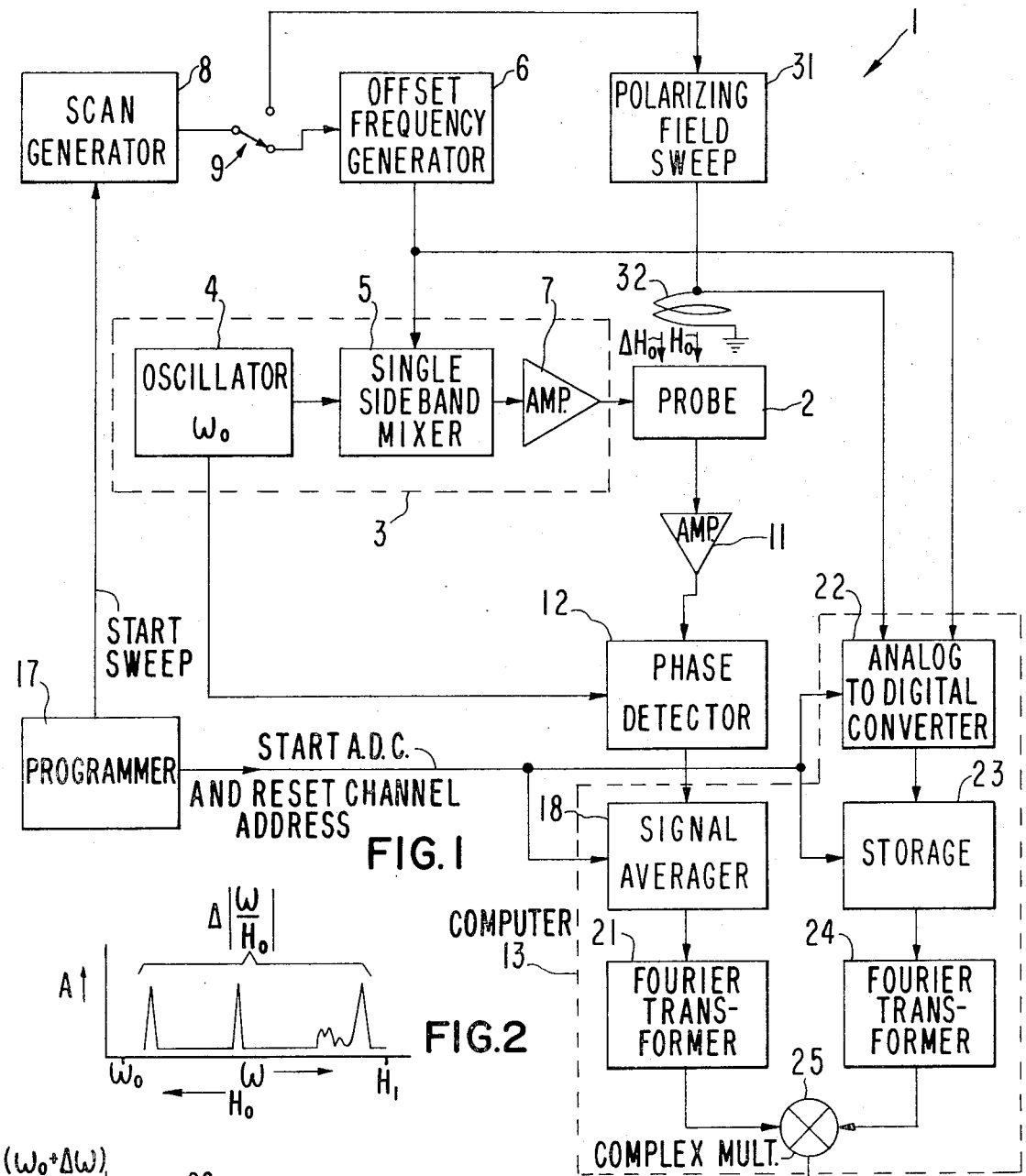

RF SPECTROMETER HAVING MEANS FOR EXCITING RF RESONANCE OF A PLURALITY OF RESONANCE LINES SIMULTANEOUSLY USING A HIGH SPEED SCANNING MEANS

DESCRIPTION OF THE PRIOR ART

Heretofore, radio frequency spectrometers have employed a pulsed radio frequency transmitter for applying a train of short bursts of radio frequency energy to a sample immersed in a polarizing magnetic field to excite resonance of a plurality of resonance lines simultaneously. The composite resonance signal emanating from the sample was picked up by a receiver, time averaged, and Fourier analyzed to separate the individual spectral components of the composite resonance signal to obtain a spectrum of the sample under analysis. Such a spectrometer is disclosed and claimed in U.S. Pat. No. 3,475,680 issued Oct. 28, 1969.

In another impulse Fourier spectrometer, a phase sensitive analog Fourier analyzer was provided for separating the real and imaginary components of the composite resonance spectral signal, whereby either the pure absorption or pure dispersion mode of the spectrum may be observed. Such a spectrometer is disclosed and claimed in U.S. Pat. No. 3,461,381 issued Aug. 12, 1969. While these impulse resonance spectrometers greatly reduce the amount of time required for an analysis of a given sample, they have the disadvantage that the peak power of the transmitted radio frequency energy has to be relatively high to achieve wideband excitation of a sample under analysis.

In another rf spectrometer, the transmitter peak power requirements for simultaneously exciting wideband resonance of the sample under analysis was substantially reduced by modulating the transmitter phase of cw radio frequency energy applied to the sample in a pseudo-random sequence. Such a spectrometer is disclosed and claimed in co-pending U.S. application Ser. No. 847,859 filed Aug. 6, 1969 now U.S. Pat. No. 3,581,191 and assigned to the same assignee as the present invention. This latter spectrometer has the advantage of substantially reducing the peak power of the radio frequency transmitter employed for exciting continuous simultaneous resonance of the resonance lines within the sample under analysis.

SUMMARY OF THE PRESENT INVENTION

The principal object of the present invention is the provision of an improved rf spectrometer having greatly reduced peak power requirements.

One feature of the present invention is the provision of method and apparatus, in an rf spectrometer, for simultaneously exciting plural resonance lines by repetitively scanning the ratio of the frequency $\omega$ of the applied radio frequency energy to the intensity $H_0$ of the polarizing magnetic field over a range of values wide enough to cover a spectrum to be analyzed, the scanning rate being high enough to excite simultaneous resonance of the plural resonance lines within the scanned range of values.

In another feature of the present invention, the repetitive scanning means scans the ratio of $\omega/H_0$ at a repetition rate sufficiently high such that simultaneous resonance of the plural resonance lines persists between successive scans, whereby simultaneous resonance is sustained.

In another feature of the present invention, a composite resonance signal containing the plural simultaneously excited resonance signals is time averaged and Fourier analyzed for separating the individual resonance lines within the spectrum under analysis.

Other features and advantages of the present invention will become apparent upon a perusal of the following specification, taken in connection with the accompanying drawings, wherein:

BRIEF DESCRIPTION OF THE DRAWINGS

FIG. 1 is a schematic block diagram of a radio frequency spectrometer incorporating features of the present invention, FIG. 2 is a plot of signal amplitude versus radio frequency $\omega$ and polarizing magnetic field intensity $H_0$ showing a spectrum of a sample under analysis corresponding to a certain range $\Delta$ for the ratio of $\omega/H_0$, FIG. 3 is a plot of frequency of applied radio frequency energy $\omega$ or polarizing field intensity H vs. time depicting a repetitive scan embodiment of the present invention, FIG. 4 is a plot of radio frequency power Prf. vs. time.

DESCRIPTION OF THE PREFERRED EMBODIMENTS

Figure 7:
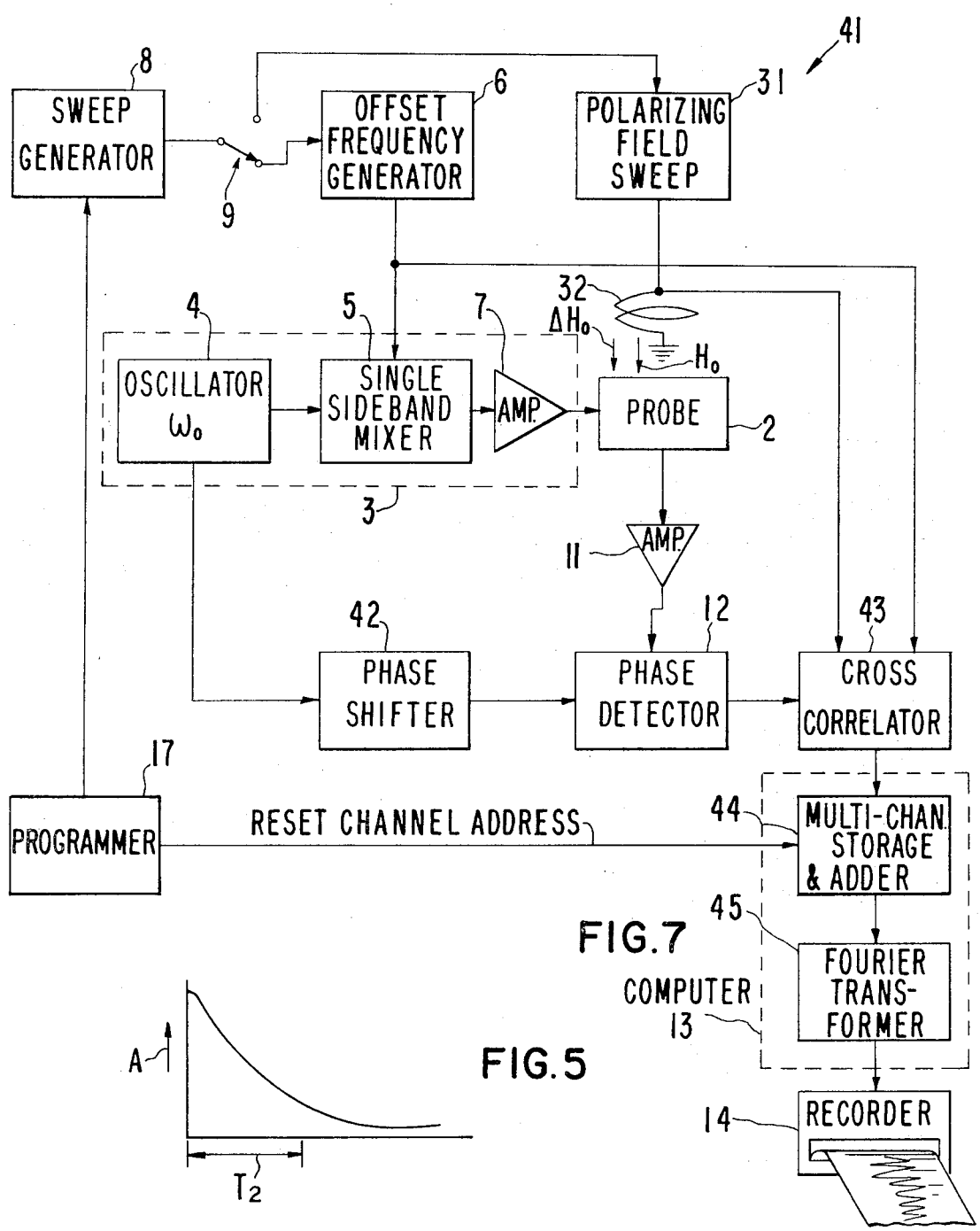
FIG. 7 is a schematic block diagram of a radio frequency spectrometer incorporating alternative features of the present invention.

Referring now to FIG. 1, there is shown a radio frequency spectrometer 1 incorporating features of the present invention. In the spectrometer 1, a sample of matter to be investigated, such as a gyromagnetic resonance sample having a plurality of resonance lines to be examined, is disposed within a suitable probe structure 2 and immersed in a polarized magnetic field of intensity $H_0$. The polarizing magnetic field $H_0$ is produced by a permanent magnet or electromagnet, not shown.

Radio frequency energy from a ratio frequency transmitter 3 is supplied to the probe 2 for applying the radio frequency energy to the sample with the magnetic field vector of the radio frequency energy at a substantial angle, such as 90° to the direction of the polarizing magnetic field $H_0$. The frequency $\omega$ of the radio frequency energy supplied from the transmitter 3 to the probe 2 is related to the intensity of the polarizing magnetic field $H_0$ such that the ratio of $\omega/H_0$ is of a value to excite resonance of the sample within the probe 2.

In the case of gyromagnetic resonance, the ratio of $\omega/H_0$ is equal to the gyromagnetic resonance constant $\gamma$ for the particular group of gyromagnetic bodies being excited into resonance i.e., near to resonance for the particular resonance line. Examples of gyromagnetic bodies include, nuclei, electrons, and quadrupole resonance groups or lines. The gyromagnetic ratios for the individual groups or lines may be slightly different as produced by chemical shifting, spin coupling, dipole-dipole effects or other perturbations.

The radio frequency transmitter 3 includes a radio frequency oscillator 4 for producing radio frequency energy of a frequency $\omega_0$. The output of the radio frequency oscillator is fed to a single sideband mixer 5 wherein it is mixed with the output of an offset audio frequency generator 6 to produce a sideband output radio frequency signal which is amplified by amplifier 7 and thence fed to probe 2 for exciting resonance of the sample.

A spectrum of the sample under analysis is swept or scanned by changing the frequency of the offset frequency generator 6 with a signal derived from a scan generator 8 and applied to the offset frequency generator 6 via switch 9.

Resonance signals emanating from the sample under analysis and contained within the probe 2 are received in a suitable receiver structure within the probe 2, such as an rf coil, and fed to the input of a radio frequency amplifier 11 wherein they are amplified. The amplified r.f. output is fed to one input of a radio frequency phase detector 12 for phase detection against a sample of the oscillator frequency $\omega_0$ to obtain an audio frequency spectrum of the sample under analysis. The spectrum signal is fed to a Fourier and time-averaging computer 13 for time-averaging and separating the Fourier components to derive the spectrum of the sample under analysis. The output spectrum is fed from the computer 13 to a recorder 14 to obtain a recorded spectrum of the sample under analysis.

The spectrum of the sample under analysis is repetitively scanned, either by repetitively scanning the frequency of the radio frequency energy or by repetitively scanning the intensity of the polarizing magnetic field. In the embodiment which scans the frequency of the applied radio frequency energy, a scan sequence is depicted in FIG. 3. More particularly, the frequency of the radio frequency energy $\omega$ (see FIG. 2) is scanned from a first frequency $\omega_0$ to a second frequency $\omega_0 + \Delta\omega$ to cover the range of gyromagnetic resonance constants within the spectrum to be analyzed.

Figure 5:
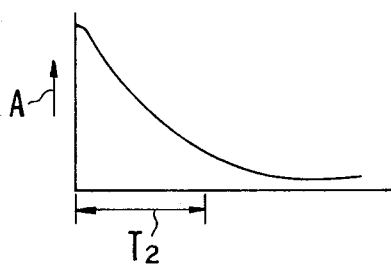
FIG. 5 is a plot of signal amplitude vs. time depicting the transverse relaxation time of a resonance line.

In the case of a nuclear gyromagnetic resonance, when examining resonance of chemically shifted protons, a typical range of $\Delta\omega$ is approximately 1,000 Hz. The frequency of the radio frequency energy is scanned rapidly from $\omega_0$ to $\omega_0 + \Delta\omega$. The rate of such scan is sufficiently high so that gyromagnetic resonance of the lines within the spectrum are sustained simultaneously. In order that this may be accomplished, the scan rate should be sufficiently high such that the spectrum to be analyzed is scanned in a time on the order of the transverse relaxation time of the resonance line within the sample having the shortest relaxation time. For protons in a homogenous magnetic field, the transverse relaxation time $T_2$ is on the order of 1 second. A transverse relaxation time $T_2$ is shown in FIG. 5 and is determined by the time for the envelope of a resonance line to decay from a given peak amplitude to a value of $1/e$ of the peak amplitude.

The scan rate and width of the scan is determined by a programmer 17 which controls the operation of the scan generator 8 and which also provides a synchronizing output signal to the computer 13. The computer 13 includes a signal averager 18 which receives a composite transient audio frequency resonance signal of a character as depicted by line 19 in FIG. 6. This signal is periodically sampled at relatively short intervals, as of 1 millisecond, indicated by the time span between adjacent time marks $t_0, t_1, t_r \ldots t_n$ of FIG. 6 for each scan of the resonance spectrum.

The sampled signal amplitudes are converted by an analog-to-digital converter into digital information and stored in respective different channels of a multi-channel memory within the signal averager. Since each scan output of scan generator 8 is synchronized by the programmer 17 with the sampling of the resultant composite resonance signal the information stored in each channel of the signal average 18 produces a time-average or an integration of that portion of the composite resonance signal. This serves to average out noise in the conventional manner.

After a suitable number of scans of the sample spectrum have been signal averaged by signal averager 18, the signals stored in the respective channels are read out to a Fourier transformer 21 wherein they are Fourier transformed. The Fourier transformer 21 transforms the information from the time domain to the frequency domain, thereby obtaining the separated resonance frequency components of the composite resonance signal which has been time averaged by signal averager 18.

Concurrently, a sample of the audio frequency scan signal as derived from the output of offset frequency generator 6 is fed to an analog-to-digital converter 22 within the computer 13 for converting the offset frequency scan signal to digital data which is stored in respective channels of a memory in the same manner as the composite resonance signal was stored in signal averager 18. The analog-to-digital converter 22 and storage 23 are synchronized by a start analog-to-digital converter and reset channel address signal derived from the programmer 17.

The output of the scan signal storage 23 is fed to the input of a second Fourier transformer 24 for transforming the scan signal data from the time domain to the frequency domain. The output of the signal fourier transformer 21 is multiplied with the output of the scan fourier transformer 24 in a complex multiplier 25 to obtain a cross correlation between the scan signal and the resonance signal. The output of the cross correlation corresponds to the spectrum of the sample under analysis. The spectrum signal is fed to the recorder 14 for recording as a function of time or as a function of the output of the Fourier transformer 21 to obtain the recorded spectrum of the sample under analysis.

The computer 13 may comprise, for example, a Varian Data Machine Model 620*i*, general purpose computer programmed to use a fast Fourier transform algorithm as described by J.W. Cooley and J.W. Tukey in Mathematical Computation, Volume 19, page 297 (1966) and modified by G.D. Burgland in Communications of the ACM No. 11, page 703 (1968).

The scan waveform as shown at 28 in FIG. 3 need only have a slope or rate or change of scan sufficiently high such that in the time it takes to scan through the desired spectrum under analysis a resonance line excited at one end of the spectrum is still resonating when the scan reaches the other end of the spectrum such that all the lines are in resonance simultaneously within the band of frequencies to be scanned.

The scan waveform 28 need not repeat immediately, that is, the repetition frequency of the scan may be such that during one cycle of the scan the resonance of the simultaneously excited resonance lines within the spectrum under analysis decay to a substantially zero amplitude.

However, in a preferred embodiment, the repetition rate or repetition frequency of the scan cycle is such that the scan repeats at a sufficiently high frequency such that resonance is sustained from one scan cycle to the next. In order that this be accomplished the inverse of the scan frequency or in other words the period of the scan cycle is preferably about equal to or less than the transverse relaxation time $T_2$ of the fastest decaying line within the sample under analysis. Generally speaking, if the period of the scan cycle is equal to or less than approximately three times the transverse relaxation time $T_2$ the simultaneous resonance will be sustained.

When the period of the scan is equal to the period of the scan repetition cycle, maximum utilization is being obtained of the radio frequency energy applied to the sample such that the rf power level remains constant with time. The advantage of utilizing constant rf power with a scan repetition period equal to the scan period is that most efficient utilization of the rf power is obtained for a given rf peak power amplitude. When this mode is contrasted with the impulse rf spectrometers of the prior art, as exemplified by the aforecited U.S. Pat. No. 3,475,680, it is seen that the spectrometer of the present invention reduces the peak power required by approximately a factor of $10^4$, thereby greatly simplifying the design and power requirements for the spectrometer.

As an alternative embodiment of the present invention, switch 9 is switched from the offset frequency generator to the input of a polarizing field sweep 31 such that the intensity of the polarizing magnetic field, $H_0$ is swept over a range of values $\Delta H_0$, as indicated in FIGS. 2 and 3, while the frequency $\omega$ of the rf energy remains constant. The output of the polarizing field sweep 31 is fed to a sweep coil 32 for superimposing a sweep field component $\Delta H_0$ on the polarizing magnetic field $H_0$ to sweep through the resonance spectrum of the sample under analysis. A sample of the sweep signal is fed to the input of the computer 13 to serve the same function as the sample from the output of the offset frequency generator 6 and described in the previous embodiment.

Referring now to FIG. 7, there is shown an alternative Fourier transform rf spectrometer 41 incorporating features of the present invention. The spectrometer 41 is substantially the same as that previously described with regard to FIG. 1 with exception that the computer 13 has been somewhat simplified and the cross correlation function is performed upstream of the computer 13. More specifically, the output of the phase detector 12 is set to either the absorption or the dispersion mode output by changing the phase of the reference signal from the oscillator 4 by 90° by means of phase shifter 42.

Figure 6:
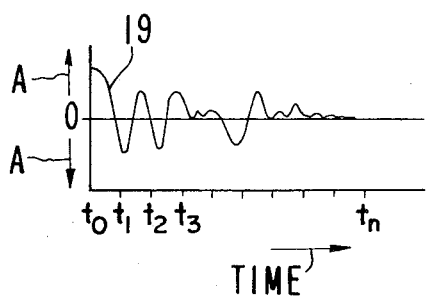
FIG. 6 is a plot of composite resonance signal amplitude vs. time depicting the transient characteristics of a composite resonance signal.

The audio frequency composite resonance signal in the output of phase detector 12 is fed to one input of a cross correlator 43 for frequency scan generator 6 or polarizing field sweep 31, depending upon which mode of operation the spectrometer is utilizing, as determined by the position of switch 9. Cross correlator 43 comprises merely a complex multiplier and the output of the cross correlator 43 is fed to an analog-to-digital converter. The complex resonance signal as sampled at a multitude of time displacement intervals as indicated in FIG. 6 is stored in the respective channels of a storage and adder 44 to obtain a time average of the composite resonance signal. The multi-channel storage and adder 44 is synchronized with the scan by a means of an output derived from the programmer 17 which resets the channel address within storage and adder 44. The time averaged complex resonance data is fed, after a multitude of scans of the resonance spectrum, to a Fourier transformer 45 for transforming the time averaged spectral data from the time domain to the frequency domain. The output of the Fourier transformer 45 is fed to the input of a recorder 14 for recording a spectrum of the sample under analysis.

Although the invention, as thus far described, has been described as it relates to exciting and detecting resonance of gyromagnetic resonance bodies, the invention is not limited to gyromagnetic resonance spectrometers. It is applicable in general to microwave spectrometers, nuclear resonance spectrometers, electron spin spectrometers, and nuclear quadrupole resonance spectrometers.

What is claimed is:

1. In a radio frequency spectrometer, means for exciting radio frequency resonance of a plurality of resonance lines simultaneously in a sample of matter under investigation immersed in a polarizing magnetic field $H_0$ to produce a composite resonance line signal, means for receiving the composite resonance line signal emanating from the sample and containing the simultaneously excited plural resonance line signals within the sample of matter under analysis, the improvement wherein, said means for exciting radio frequency resonance of the plural resonance line simultaneously includes, means for irradiating the sample in the polarizing magnetic field with radio frequency energy of a frequency $\omega$ which is related to the intensity $H_0$ of the polarizing magnetic field such that the ratio of $\omega/H_0$ is a value to excite resonance of the resonance lines, means for repetitively scanning the ratio of $\omega/H_0$ over a range of values to initially excite each said resonance line at a different time, said means for scanning having a scanning rate sufficiently high to excite simultaneous resonance of the plural resonance lines within the scanned range of values for the ratio $\omega/H_0$, and computer means, said computer means connected to said receiver means, said computer means including means for time-averaging and means for separating the individual resonance lines within the spectrum under analysis and means for displaying said separated lines.

2. The apparatus of claim 1 wherein said scanning means repetitively scans said ratio of $\omega/H_0$ at a repetition rate sufficiently high to sustain simultaneous resonance of the plural resonance lines between successive scans.

3. The apparatus of claim 1 wherein said means for repetitively scanning the ratio of $\omega/H_0$ includes, means for repetitively scanning the frequency $\omega$ of the radio frequency energy.

4. The apparatus of claim 1 wherein said means for repetitively scanning the ratio of $\omega/H_0$ includes, means for repetitively scanning the intensity $H_0$ of the polarizing magnetic field.

5. The apparatus of claim 1 wherein said means for separating includes, first means for Fourier analyzing the received composite resonance signal, said first means having an output.

6. The apparatus of claim 5 wherein said means for separating further including a second means for Fourier analyzing a signal responsive to said means for repetitively scanning the ratio of $\omega/H_0$, said second means having an output, and a complex multiplier for complex multiplying the output of said first Fourier analyzer means times said output of said second Fourier analyzer means.

7. The apparatus of claim 1 wherein said means for separating comprises a cross-correlator coupled to said receiver and to a signal responsive to said means for repetitively scanning the ratio of $\omega/H_0$ for cross-correlating said received composite resonant signal with said scanning signal.

8. In a method for deriving a resonance spectrum of a sample under analysis the steps of, exciting radio frequency resonance of a plurality of resonance lines simultaneously in the sample of matter under investigation immersed in a polarizing magnetic field $H_0$ to produce a composite resonance line signal, receiving the composite resonance signal emanating from the sample and containing the simultaneously excited plural resonance line signal within the sample of matter under analysis, the improvement wherein, said step of exciting radio frequency resonance of the plural resonance lines simultaneously includes the step of, irradiating the sample in the polarizing magnetic field with radio frequency energy of a frequency $\omega$ which is related to the intensity $H_0$ of the polarizing magnetic field such that the ratio of $\omega/H_0$ is scanned over a range of values with a scanning rate high enough to excite simultaneous resonance of the plural resonance line within the scanned range of values for the ratio of $\omega/H_0$, and wherein the step of receiving the composite resonance line signal includes the step of, time-averaging and separating the individual resonance lines from the composite resonance line signal to obtain a spectrum of the sample under analysis.

9. The method of claim 8 wherein the step of repetitively scanning the ratio of $\omega/H_0$ includes the step of, scanning with a repetition rate sufficiently high to sustain simultaneous resonance of the plural resonance lines between successive scans.

10. The method of claim 8 wherein the step of repetitively scanning the ratio of $\omega/H_0$ includes the step of, repetitively scanning the frequency $\omega$ of the radio frequency energy.

11. The method of claim 8 wherein the step of repetitively scanning the ratio of $\omega/H_0$ includes the step of, repetitively scanning the intensity $H_0$ of the polarizing magnetic field.

12. The method of claim 8 wherein the inverse of the scanning repetition frequency is less than three times the characteristic transverse relaxation time $T_2$ of the resonance lines being excited, whereby simultaneous resonance is sustained of the plural excited resonance lines.

13. The method of claim 8 wherein the step of receiving the composite resonance line signal includes the step of, complex multiplying a signal representative of said composite resonant line signal times a signal representative of said scanned ratio $\omega/H_o$.

* * * * *